United States Patent [19]

Kolts

[11] Patent Number: 4,830,844

[45] Date of Patent: May 16, 1989

[54] OXIDATION OF CARBON MONOXIDE AND CATALYST COMPOSITION THEREFOR

[75] Inventor: John H. Kolts, Ochelata, Okla.

[73] Assignee: Phillips Petroleum Company, Bartlesville, Okla.

[21] Appl. No.: 106,470

[22] Filed: Oct. 6, 1987

[51] Int. Cl.$^4$ ............................................. C01B 31/20
[52] U.S. Cl. .................... 423/437; 423/213.5; 423/247; 502/310; 502/333; 502/334; 502/339; 502/349
[58] Field of Search ............... 423/213.5, 247, 437; 502/310, 333, 334, 339, 349

[56] References Cited

U.S. PATENT DOCUMENTS

| | | | |
|---|---|---|---|
| 3,779,947 | 12/1973 | Mitsche et al. | 502/334 |
| 3,794,588 | 2/1974 | Stiles | 252/462 |
| 3,794,599 | 2/1974 | Dautzenberg et al. | 502/334 |
| 3,898,184 | 8/1975 | Hara et al. | 423/213.5 |
| 3,909,452 | 9/1975 | Acres | 252/455 R |
| 3,963,827 | 6/1976 | Acres et al. | 423/239 |
| 4,117,082 | 9/1978 | Matsuyama | 423/247 |
| 4,123,391 | 10/1978 | Noguchi et al. | 252/466 PT |
| 4,130,507 | 12/1978 | Hayes | 502/310 |
| 4,252,687 | 2/1981 | Dale et al. | 252/455 Z |
| 4,317,460 | 3/1982 | Dale et al. | 423/247 |
| 4,350,613 | 9/1982 | Nishino et al. | 252/455 R |
| 4,382,023 | 5/1983 | Mulaskey | 502/79 |
| 4,388,277 | 6/1983 | Wright | 422/211 |
| 4,459,270 | 7/1984 | Leppard et al. | 502/334 |
| 4,490,482 | 12/1984 | Mathieu | 502/339 |
| 4,492,770 | 1/1985 | Blanchard et al. | 502/304 |
| 4,524,051 | 6/1985 | Wright et al. | 423/247 |
| 4,536,375 | 8/1985 | Holt et al. | 423/247 |
| 4,639,432 | 1/1987 | Holt et al. | 502/324 |

FOREIGN PATENT DOCUMENTS

| | | | |
|---|---|---|---|
| 57-65331 | 4/1982 | Japan | 423/247 |
| 2028571 | 3/1980 | United Kingdom | 423/247 |
| 2083687 | 3/1982 | United Kingdom | 423/247 |

OTHER PUBLICATIONS

"The Catalytic Oxidation of CO for sealed $CO_2$ Laser Applications", by I. Miller et al., pp. #115, American Chemical Society Meeting, Division of Colloid and Surface Chemistry, Chicago, 1985.

"Celcor ® Honeycomb Ceramic Catalyst Supports" product brochure of Corning Glass Works.

Primary Examiner—John Doll
Assistant Examiner—Robert M. Kunemund
Attorney, Agent, or Firm—K. K. Brandes

[57] ABSTRACT

A composition of matter comprising monolith support material, $SnO_2$, Pt and/or Pd and at least one Cr compound is prepared by a process comprising the steps of coating a monolith material with colloidal $SnO_2$, drying, impregnation with compounds of Pt and/or Pd and Cr (and preferably Mn), drying/calcining, and heating in a reducing gas at a temperature of about 0–300° C. This composition of matter is used as a catalyst in a process for oxidizing CO with $O_2$ to $CO_2$, preferably in a $CO_2$ laser.

36 Claims, No Drawings

OXIDATION OF CARBON MONOXIDE AND CATALYST COMPOSITION THEREFOR

BACKGROUND OF THE INVENTION

This invention relates to the oxidation of carbon monoxide to carbon dioxide. In another aspect, this invention relates to the catalytic oxidation of carbon monoxide, in particular under conditions suitable for laser applications. In a further aspect, this invention relates to an effective CO oxidation catalyst composition. In still another aspect, this invention relates to a process for preparing a CO oxidation catalyst compositions.

The use of catalysts for the oxidation of carbon monoxide to carbon dioxide by reaction with oxygen, in particular at low temperature, is of much interest, e.g., in breathing masks designed to remove CO from inhaled air, and in $CO_2$ lasers for combining CO and $O_2$ formed by dissociation of $CO_2$ during discharge. In the latter application the presence of $O_2$ is most undesirable because it can cause a breakdown of the electrical field in the laser cavity. Several patents, such as U.S. Pat. Nos. 4,490,482, 4,536,375 and 4,639,432, disclose compositions useful as CO oxidation catalysts in $CO_2$ laser applications. However, there is an ever present need to develop new, effective CO oxidation catalyst compositions and/or improved processes for preparing effective CO oxidation catalyst compositions.

SUMMARY OF THE INVENTION

It is an object of this invention to provide a composition of matter which is effective as a catalyst composition for the oxidation of carbon monoxide. It is another object to provide a process for preparing a composition of matter which is effective as a catalyst composition for the oxidation of carbon monoxide. It is a further object of this invention to provide an effective process for catalytically oxidizing carbon monoxide. Other objects and advantages will be apparent from the detailed description and the claims.

In accordance with this invention, a process for preparing a composition of matter (being effective as a catalyst composition for the oxidation of CO with $O_2$) comprising $SnO_2$, Pt and/or Pd and oxide of Cr comprises the step of:

(A) impregnating a monolith material, (i.e., a porous ceramic honeycomb material) with a colloidal dispersion (also referred to as a colloidal solution) of tin dioxide in a suitable liquid dispersion medium (preferably water), (B) heating the tin dioxide-coated material obtained in step (A) under such conditions as to obtain a substantially dried tin dioxide-coated monolith material;

(C) impregnating the substantially dried tin dioxide-coated monolith material obtained in step (B) with at least one dissolved compound of at least one noble metal selected from the group consisting of platinum and palladium and with at least one dissolved compound of chromium (Cr);

(D) heating the material obtained in step (C) under such conditions as to substantially dry the material obtained in step (C) and to at least partially (preferably substantially) convert said at least one compound of Pd and/or Pt to at least one of oxides of Pt, oxides of Pd, Pt metal and Pd metal, and said at least one compound of Cr to at least one oxide of Cr;

(E) heating the material obtained in step (D) in a reducing gas atmosphere, preferably $H_2$ and/or CO, at a temperature in the range of from about 0° C. to about 300° C., under such conditions as to activate said material obtained in step (D), i.e., to make it more active as a CO oxidation catalyst.

The impregnation step (A) can be carried out once or twice or more than twice in sequence, so as to ensure adequate coating of the monolith with $SnO_2$. Step (C) can be carried out by simultaneous or sequential impregnation (in any order) of the material obtained in step (B) with dissolved compounds of Pt and/or Pd and of Cr. Step (D) is preferably carried out as a sequence of sub-steps: drying sub-step (D1) and calcining sub-step (D2). Preferably, at least one compound of Mn is also used in step (C) and is at least partially (preferably substantially) converted to at least one oxide of Mn in step (D).

Also in accordance with this invention, there is provided a composition of matter (useful and effective as a catalyst composition for the oxidation of CO with $O_2$) comprising (i) a monolith support material, (ii) $SnO_2$, (iii) at least one noble metal selected from the group consisting of Pt and Pd and (iv) at least one compound (preferably oxide) of Cr; said composition of matter having been prepared by the process, described above, comprising steps (A), (B), (C), (D) and (E). Preferably said composition of matter additionally comprises (v) at least one compound (preferably oxide) of manganese (Mn). In a more preferred embodiment, the composition of matter of this invention consists essentially of components (i), (ii), (iii), (iv) and (v).

Further in accordance with this invention, a process for oxidizing carbon monoxide comprises contacting a gas comprising CO and $O_2$ with a catalyst composition comprising (i) a monolith support material, (ii) $SnO_2$, (iii) at least one noble metal selected from the group consisting of Pt and Pd and (iv) at least one compound (preferably oxide) of Cr; said catalyst composition having been prepared by a process comprising steps (A), (B), (C), (D) and (E), as defined above, under such conditions as to at least partially (preferably substantially) convert CO and $O_2$ to $CO_2$.

Preferably, in the CO oxidation process of this invention the catalyst composition of this invention (described above) additionally comprises (v) at least one compound (preferably oxide) of Mn. In a preferred embodiment, the CO oxidation process of this invention is carried out at a temperature of below 100° C. (more preferably from about 0° C. to about 90° C.). In another preferred embodiment, the CO oxidation process is carried out in a $CO_2$ laser so as to recombine CO and $O_2$, which have been formed by decomposition of $CO_2$.

DETAILED DESCRIPTION OF THE INVENTION

Any suitable monolith material can be used as support material (i). Monolith materials, also referred to as honeycomb ceramic materials, are commercially available, (e.g., from Corning Glass Works, Corning, NY). Monolith materials have been described in U.S. Pat. Nos. 4,388,277 and 4,524,051, the disclosures of which are herein incorporated by reference, and in product brochures of monolith manufacturers, e.g., Corning Glass Works.

In step (A) of the preparation process of this invention, a monolith is impregnated (once or twice or more than twice in sequence) with a colloidal dispersion (colloidal solution) of tin dioxide. Colloidal solution of $SnO_2$ have been described in U.S. Pat. Nos. 4,490,482, 4,536,375 and 4,639,432, the disclosure of which is herein incorporated by reference. Preferably, colloidal particles of $SnO_2$ having an average particle diameter of about 1 to about 100 nanometers, more preferably about 5 to about 20 nanometers, are dispersed in a suitable liquid dispersion medium, such as water, alcohols, ketones and the like, preferably water. Generally, the concentration of $SnO_2$ in the colloidal dispersion is in the range of from about 0.1 to about 50, preferably from about 5 to about 25, weight percent $SnO_2$. The weight ratio of colloidal dispersion of $SnO_2$ to the monolith material in step (A) is chosen so as to provide a $SnO_2$ content of the composition of matter of this invention in the range of from about 1 to about 50 weight-% $SnO_2$, preferably about 5 to about 40 weight-% $SnO_2$.

Drying step (B) can be carried out in any suitable manner. Generally the material obtained in step (A) is heated at such temperature and for such a period of time so as to substantially remove therefrom liquids (in particular the solvent of the impregnating solution used in the previous step). Generally, step (B) is carried out in an inert or oxidizing gas atmosphere (such as air), preferably at a temperature in the range of from about 30° to about 200° C. (more preferably about 80°–120° C.) for about 0.5 to about 10 hours, so as to reduce the level of occluded or adhered liquid (in particular water), preferably to below about 20 weight-% liquid.

The impregnation of the substantially dried $SnO_2$-coated support material with Pt and/or Pd (preferably both) and Cr in step (C) can be carried out in any suitable manner. Preferably, suitable compounds of Pt and/or Pd and of Cr are dissolved in a suitable solvent (preferably water) so as to prepare solutions of suitable concentration, generally containing from about 0.005 to about 0.20, preferably about 0.01–0.1, g Pt and/or Pd per cc of solution, and about 0.002 to about 0.10, preferably about 0.005–0.01, g Cr per cc solution. Non-limiting examples of suitable compounds of Pt, Pd and Cr are: $PtCl_2$, $PtCl_4$, $H_2PtCl_6$, $PtBr_4$, $Pt(NH_3)_4Cl_2$, $Pt(NH_3)_4(NO_3)_2$, and the like; $PdCl_2$, $PdCl_4$, $H_2PdCl_6$, $Pd(NH_3)_4(NO_3)_2$ and the like; $Cr(NO_3)_3$, $Cr_2(SO_4)_3$, $NH_4Cr(SO_4)_2$, $Cr(CH_3CO_2)_3$, $Cr(NH_3)_6Cl_3$, $Cr(NH_3)_6(NO_3)_3$, and the like; preferably (at present) $Pt(NH_3)_4(NO_3)_2$, $Pd(NH_3)_4(NO_3)_2$ and $Cr(NO_3)_3$.

The $SnO_2$-coated support material is impregnated by soaking it in the solution of Pt and/or Pd and Cr compounds; or (less preferably) the Pt and/or Pd and Cr containing solution is sprayed onto the support material. The ratio of Pt and/or Pd and Cr containing solution to $SnO_2$-coated support material generally is such that the material obtained in step (E) excluding the monolith, will contain about 0.5 to about 5, preferably about 1 to about 3, weight-% Pt or Pd or (Pt+Pd), and about 0.1 to about 3, preferably about 0.2 to about 1, weight-% Cr (preferably present as oxide of Cr).

In a preferred embodiment, at least one compound of Mn is also present as a copromoter in the impregnating solution (besides Pt and/or Pd and Cr). Non-limiting examples of suitable Mn compounds are $MnCl_2$, $MnSO_4$, $Mn(NO_3)_2$, $KMnO_4$, and the like, preferably $Mn(NO_3)_2$. Generally, the concentration of the Mn copromoter compound (expressed as metal) is in the range of from about 0.002 to about 0.20, preferably about 0.003 to about 0.02 gram Mn per cc solution. Preferably the material obtained in step (E) contains about 0.1 to about 2 weight-% Mn, more preferably about 0.2–1.0 weight-% Mn (most preferably present as oxide).

The impregnation of the $SnO_2$-coated support material with compounds of Pt and/or Pd, Cr and, preferably, Mn can be carried out either by sequential impregnation (first Pt and/or Pd, then Cr, then Mn; or first Pt and/or Pd and Cr together, then Mn; or first Pd then Cr, then Pt, then Mn; or by any other sequence).

Heating step (D) is generally carried out in an inert or oxidizing atmosphere, preferably a free oxygen containing gas atmosphere (such as air), generally at a temperature ranging from about 30° to about 500° C. Preferably, heating step (D) is carried out in two sequential substeps: drying sub-step (D1), generally at about 30° to about 200° C. (preferably at 80°–130° C.), generally for about 0.5 to about 10 hours, so as to substantially dry the impregnated material obtained in step (C) (preferably under such conditions as to reduce the level of adhered and accluded liquid to less than about 20 weight-%); and calcining sub-step (D2), generally at about 200° to about 500° C. (preferably about 200° to about 400° C.), generally for about 0.5 to about 10 hours, under such conditions as to substantially calcine the dried impregnated material so as to obtain oxides of Pt and/or Pd, at least one oxide of Cr and, preferably, also at least one oxide of Mn.

Reducing step (E) can be carried out in any suitable manner at a temperature in the range of from about 0° to about 300° C., preferably about 20° to about 150° C. Any reducing gas can be employed in reducing step (E), such as a gas comprising $H_2$, CO, gaseous hydrocarbons, such as methane, mixtures of the above, and the like. Preferably, a free hydrogen containing gas or a carbon monoxide containing gas, more preferably either $H_2$ or CO, is employed. Reducing step (E) can be carried out for any suitable period of time suitable to activate the calcined material obtained in the previous step, preferably from about 0.1 to about 10 hours, more preferably about 0.2–5 hours.

The process for reacting a carbon monoxide containing feed gas with a free oxygen containing gas can be carried out at any suitable temperature and pressure conditions, for any suitable length of time, at any suitable gas hourly space velocity, and any suitable volume ratio of CO to $O_2$. The reaction temperature generally is in the range of from about 0° to about 400° C., preferably about 5° to about 100° C., more preferably about 20°–40° C. The pressure during the oxidation process generally is in the range of from about 1 to about 2,000 psia, more preferably from about 5 to about 20 psia. The volume ratio of CO to $O_2$ in the feed gas can range from about 1:100 to about 100:1, and preferably is in the range of about 1:10 to about 10:1. The volume percentage of CO and the volume percentage of of $O_2$ in the feed gas can each be in the range of from about 0.05 to about 50, preferably from about 0.5 to about 3. The gas hourly space velocity (cc feed gas per cc catalyst per hour) can be in the range of from about 0.5 to about 10,000, preferably from about 1 to about 1,000. It is understood that the calculation of the gas hourly space velocity is based on the volume of the active catalyst portion, i.e., the coating of the monolith comprising $SnO_2$, Pt and/or Pd and Cr oxide (optionally also containing Mn oxide), excluding the volume occupied by the monolith support material.

The feed gas can be formed in any suitable manner, e.g., by mixing CO, $O_2$ and optionally other gases such as $CO_2$, $N_2$, He and the like. A presently preferred gas mixture is one present in a carbon dioxide laser cavity. Or the feed gas can be an exhaust gas from a combustion engine, or it can be air that is to be inhaled by humans and contains undesirable levels of toxic carbon monoxide, and the like. The feed gas can be contacted in any suitable vessel or apparatus, such as in a laser cavity or in an exhaust pipe of a combustion engine or in a gas mask used by humans, wherein the feed gas passes over the catalyst composition of this invention at the reaction conditions described above. The CO oxidation process of this invention can be carried out in any suitable setting and for any purpose, e.g., for recombining CO and $O_2$ in $CO_2$ lasers, to oxidize CO contained in exhaust gases or air, to make isotopically labeled $CO_2$ from CO and the $_8{}^{18}O$ isotope, and the like.

The following examples are presented in further illustration of the invention and are not to be construed as unduly limiting the scope of the invention.

EXAMPLE I

This example illustrates the experimental setup for testing the activity of noble metal catalysts for catalyzing the oxidation of carbon monoxide (so as to simulate catalytic recombination of CO and $O_2$ in $CO_2$ lasers).

A gaseous feed blend of 1.17 volume-% CO, 0.63 volume-% $O_2$, 47.7 volume-% $N_2$ and He as balance was passed through a needle valve and a glass reactor in an upflow direction. The glass reactor tube had an inner diameter of about 2.6 cm and generally contained a round piece of catalyst of about 2.5 cm height and about 2.5 diameter. The temperature in the catalyst bed was measured by means of a thermocouple which was placed just above the catalyst piece. The CO content in the reactor effluent was determined by means of a Beckman Model 864 IR analyzer. All tests were carried out at ambient conditions (about 27° C.). The feed rate of the gaseous feed stream was about 300 cc/minute.

EXAMPLE II

This example illustrates the effects of various copromoters on the CO oxidation activity of $Pt/Pd/SnO_2/$-monolith catalysts.

Catalyst A (Control) was a tin dioxide-coated monolith catalyst containing Pt and Pd as promoters. Catalyst A was prepared as follows. First a colloidal dispersion (colloidal solution) of $SnO_2$ was prepared by slowly dissolving 50 g tin metal in a mixture of 200 cc concentrated $HNO_3$ and 150 cc $H_2O$, with stirring at about 50° C.; then allowing undissolved material to settle and decanting the supernatant solution; adding 300 cc $H_2O$ to the settled residue and decanting the clear supernatant aqueous solution; thereafter adding sufficient aqueous ammonia so as to attain a pH of 8; filtering the solution, washing the filter contents with four 50 cc aliquots of water; and finally adding about 20 cc of a 20 weight-% solution of tetraethylammonium hydroxide in water at a slightly elevated temperature so as to obtain a clear amber colloidal solution of $SnO_2$ (containing about 20 weight-% $SnO_2$).

A round piece of Celcor ® Cordierite #9475 monolith ceramic honeycomb material ($2MgO\cdot2Al_2O_3\cdot5SiO_2$; provided by Corning Glass Works, Corning NY; diameter: 1 inch; height: 1 inch; having 100 cells per square inch) was washed with n-hexane and was dried for 1 hour at 125° C. The dried monolith was then dipped about three times into the colloidal $SnO_2$ solution described above. The thus obtained $SnO_2$-coated material (containing about 20 weight-% $SnO_2$) was dried after each dipping and thereafter calcined in air for 6 hour at 300° C. The calcined $SnO_2$-coated monolith material was dipped into an aqueous solution of Pt $(NH_3)_4(NO_3)_2$ (containing 0.033 g Pt/cc), dried at 125° C. and for 0.5 hour at 300° C. The thus impregnated material was then dipped into an aqueous solution of $(Pd(NH_3)_4(NO_3)_2$ containing 0.01 g Pd/cc), dried and heated for 1.15 hours at 300° C. The thus obtained $Pd/Pt/SnO_2$/monolith catalyst was pretreated in hydrogen gas for 1 hour at 150° C. Catalyst A contained about 1.0 weight-% Pd and about 3.3 weight-% Pt, based on the weight of the $Pd/Pt/SnO_2$ coating (i.e., excluding the weight of the monolith).

Catalyst B (Invention) was prepared by dipping Catalyst A, after use in a CO oxidation test run, several times into an aqueous solution of $Cr(NO_3)_3$ (containing 0.04 g $Cr(NO_3)_3$ per cc solution) so as to incorporate 0.4–0.5 weight-% Cr, based on the weight of the $Pd/Pt/SnO_2$ coating, into the catalyst. Catalyst B was then dried, calcined for about 1 hour in air at 300° C., and heated for about 10 minutes in a stream of hydrogen gas at 25° C.

Catalyst C (Invention) was prepared by first impregnating monolith with a 14 weight-% colloidal aqueous solution of $SnO_2$, drying the thus impregnated material, and repeating the dipping/drying procedure 4 times, substantially in accordance with the procedure for Catalyst A. The dried $SnO_2$-coated monolith material was then sequentially impregnated by repeated dipping: first into a solution comprising $Pd(NH_3)_4(NO_3)_2$ (concentration: 0.035 g Pd/cc), then into a solution comprising $Pt(NH_3)_4(NO_3)_2$ (concentration: 0.033 g Pt/cc), and finally with a solution comprising $Cr(NO_3)_3$ (concentration: 0.007 g Cr/cc). The thus impregnated material was dried at 125° C. after each dipping; calcined after final impregnation with Cr for 2 hours in air at 300° C., and then reduced for about 1 hour with $H_2$ at about 25° C. Catalyst C contained 1.66 weight-% Pd, 1.55 weight-% Pt and 0.51 weight-% Cr, all based on the weight of the $Cr/Pd/Pt/SnO_2$ coating (i.e., excluding the weight of the monolith support).

The performance of Catalysts A, B and C in carbon monoxide oxidation tests, essentially in accordance with the procedure outlined in Example I, is summarized in Table I.

TABLE I

| Catalyst | Hours on Stream | % CO Conversion | cc CO Converted per Minute |
|---|---|---|---|
| A (Control) | 1 | 88.9 | 3.12 |
| | 2 | 76.1 | 2.67 |
| | 3 | 68.4 | 2.40 |
| | 4 | 61.5 | 2.16 |
| | 5 | 53.8 | 1.89 |
| | 6 | 47.9 | 1.68 |
| | 8 | 43.6 | 1.53 |
| | 10 | 40.2 | 1.41 |
| | 12 | 36.8 | 1.29 |
| | 14 | 33.3 | 1.17 |
| | 16 | 33.3 | 1.17 |
| | 18 | 33.3 | 1.17 |
| | 20 | 33.3 | 1.17 |
| B (Invention) | 1 | 97.4 | 3.42 |
| | 2 | 97.4 | 3.42 |
| | 3 | 96.6 | 3.39 |
| | 4 | 94.9 | 3.33 |
| | 5 | 92.3 | 3.24 |
| | 6 | 89.7 | 3.17 |
| | 8 | 82.9 | 2.91 |
| | 10 | 76.9 | 2.70 |
| | 12 | 70.9 | 2.49 |
| | 14 | 66.7 | 2.34 |

TABLE I-continued

| Catalyst | Hours on Stream | % CO Conversion | cc CO Converted per Minute |
|---|---|---|---|
| | 16 | 61.5 | 2.16 |
| | 18 | 59.8 | 2.10 |
| | 20 | 53.0 | 1.86 |
| | 30 | 53.0 | 1.86 |
| C (Invention) | 1 | 99.1 | 3.48 |
| | 2 | 99.1 | 3.48 |
| | 3 | 98.3 | 3.45 |
| | 4 | 97.4 | 3.42 |
| | 5 | 94.9 | 3.33 |
| | 6 | 92.3 | 3.24 |
| | 8 | 85.5 | 3.00 |
| | 10 | 80.3 | 2.82 |
| | 12 | 75.2 | 2.64 |
| | 14 | 69.2 | 2.43 |
| | 16 | 60.7 | 2.13 |
| | 18 | 56.4 | 1.98 |
| | 20 | 51.3 | 1.80 |
| | 22 | 45.3 | 1.59 |
| | 24 | 42.7 | 1.50 |

Test results in Table I clearly show that the addition of a Cr promoter to a Pd/Pt/SnO$_2$/monolith catalyst resulted in a significant increase in CO oxidation activity.

EXAMPLE III

This example illustrates the effect of the addition of a Cr compound to a Mn/Pd/Pt/SnO$_2$/monolith catalyst on its CO activity.

Catalyst D (Control) was a Mn/Pd/Pt/SnO$_2$/monolith catalyst comprising 0.7 weight-% Mn, 2.5 weight-% Pd and 2.6 weight-% Pt, based on the weight of the Mn/Pd/Pt/SnO$_2$ coating of the catalyst (i.e., excluding the weight of the monolith which comprised about 55 weight of the total catalyst). Catalyst D was prepared substantially in accordance with the procedure for Catalyst C, except that Mn(NO$_3$)$_2$ was used in lieu of Cr(NO$_3$)$_3$, at a concentration of 0.007 g Mn/cc, in the final impregnation step. The impregnated material was dried after each dipping. Catalyst D was then crushed and sieved. A 12–20 mesh fraction was calcined for 2 hours in air at 300° C. and was then reduced in a carbon monoxide stream for 1 hour at 100° C.

Catalyst E (Invention) was prepared by repeated impregnation of 12–20 mesh uncalcined and non-reduced Catalyst D material with an aqueous solution of Cr(NO$_3$)$_3$ having a concentration of 0.007 g Cr/cc. The thus impregnated solution was dried, calcined in air at 300° C. for 2 hours, and then heated in CO at 100° C. for 1 hour. Catalyst E contained about 0.4 weight-% Cr (in addition to the Pd, Pt and Mn promoters), based on the weight of the Cr/Mn/Pd/Pt/SnO$_2$ coating.

Catalyst F (Control) was prepared by repeated impregnation of 12–20 mesh uncalcined and non-reduced Catalyst D material with the aqueous Mn(NO$_3$)$_2$ solution used for making Catalyst D. The catalyst was then dried, calcined and heated in CO as described for Catalysts D and E. Catalyst F contained 0.4 weight-% Mn more than Catalyst D (thus a total of 1.13 weight-% Mn), based on the weight of the Mn/Pd/Pt/SnO$_2$ coating.

Catalyst E* (Invention) was the same as Catalyst E, except that the reduction (1 hour at 100° C.) was carried out in a stream of H$_2$ (in lieu of CO).

Catalyst F* (Control) was the same as Catalyst F, except that the reduction (1 hour at 100° C.) was carried out in a stram of H$_2$ (in lieu of CO).

Catalysts D, E, F, E* and F* were tested at 27° C., substantially according to the procedure of Example I, except that the gas feed contained 1.2 volume-% CO, 0.6 volume-% O$_2$, 32 volume-% CO$_2$, 32 volume-% He, and N$_2$ as the balance. Furthermore, only 1 gram of catalyst material (including the weight of monolith support) was employed, and the flow rate of the gas feed was 160 cc/minute. Test results are summarized in Table II and Table III.

TABLE II

| Catalyst | Hours on Stream | % CO Conversion | cc CO Converted per Minute |
|---|---|---|---|
| D (Control) | 1 | 10.0 | 0.192 |
| | 2 | 9.2 | 0.176 |
| | 4 | 9.2 | 0.176 |
| | 6 | 10.8 | 0.208 |
| | 8 | 12.5 | 0.240 |
| | 10 | 13.3 | 0.256 |
| | 12 | 14.2 | 0.272 |
| | 14 | 15.0 | 0.288 |
| | 16 | 15.8 | 0.304 |
| | 18 | 15.8 | 0.304 |
| | 20 | 17.5 | 0.336 |
| | 22 | 17.5 | 0.336 |
| | 24 | 18.3 | 0.352 |
| E (Invention) | 1 | 10.0 | 0.192 |
| | 2 | 10.0 | 0.192 |
| | 4 | 10.8 | 0.208 |
| | 6 | 12.5 | 0.240 |
| | 8 | 15.0 | 0.288 |
| | 10 | 20.0 | 0.384 |
| | 12 | 23.3 | 0.448 |
| | 14 | 25.0 | 0.480 |
| | 16 | 29.2 | 0.560 |
| | 18 | 37.5 | 0.720 |
| | 20 | 54.2 | 1.040 |
| | 22 | 67.5 | 1.296 |
| | 24 | 80.0 | 1.536 |
| F (Control) | 1 | 7.5 | 0.144 |
| | 2 | 7.5 | 0.144 |
| | 4 | 9.2 | 0.176 |
| | 6 | 10.8 | 0.208 |
| | 8 | 12.5 | 0.240 |
| | 10 | 14.2 | 0.272 |
| | 12 | 15.8 | 0.304 |
| | 14 | 19.2 | 0.368 |
| | 16 | 23.3 | 0.448 |
| | 18 | 26.7 | 0.512 |
| | 20 | 31.7 | 0.608 |
| | 22 | 35.8 | 0.688 |
| | 24 | 39.2 | 0.752 |

TABLE III

| Catalyst | Hours on Stream | % CO Conversion | cc CO Converted per Minute |
|---|---|---|---|
| E* (Invention) | 1 | 9.2 | 0.176 |
| | 2 | 13.3 | 0.256 |
| | 4 | 23.3 | 0.448 |
| | 6 | 34.2 | 0.656 |
| | 8 | 45.8 | 0.880 |
| | 10 | 50.8 | 0.976 |
| | 12 | 50.8 | 0.976 |
| | 14 | 50.8 | 0.976 |
| | 16 | 50.0 | 0.960 |
| | 18 | 50.0 | 0.960 |
| | 20 | 50.0 | 0.960 |
| | 22 | 49.2 | 0.944 |
| | 24 | 48.3 | 0.928 |
| F* (Control) | 1 | 9.2 | 0.176 |
| | 2 | 11.7 | 0.226 |
| | 4 | 17.5 | 0.336 |
| | 6 | 25.0 | 0.480 |
| | 8 | 30.8 | 0.592 |
| | 10 | 32.5 | 0.624 |
| | 12 | 32.5 | 0.624 |
| | 14 | 35.5 | 0.624 |
| | 16 | 31.7 | 0.608 |
| | 18 | 31.7 | 0.608 |

TABLE III-continued

| Catalyst | Hours on Stream | % CO Conversion | cc CO Converted per Minute |
|---|---|---|---|
| | 20 | 31.7 | 0.608 |
| | 22 | 31.7 | 0.68 |

Test results in Tables II and III clearly show that the addition of 0.4 weight-% Cr to a monolith-supported Mn/Pd/Pt/SnO$_2$ catalyst resulted in a significant increase in CO oxidation activity (compare Catalyst E with Catalyst D), whereas the addition of an equivalent amount of Mn to the same catalyst resulted in a much less dramatic increase in CO oxidation activity (compare Catalyst F with Catalyst E). The above-described unexpected effect of the addition of Cr (vs. an equivalent addition of Mn) also prevailed when the Catalysts were reduced with H$_2$ (compare Catalyst E* with Catalyst F).

Reasonable variations, modifications and adaptations for various usages and conditions can be made within the scope of the disclosure and the appended claims, without departing from the scope of this invention.

That which is claimed is:

1. A process for oxidizing carbon monoxide comprising the step of
   contacting a gas mixture comprising CO and O$_2$ with a catalyst composition comprising monolith support material, tin dioxide, at least one noble metal selected from the group consisting of platinum and palladium, and at least one oxide of chromium, under such reaction conditions as to at least partially convert said CO and O$_2$ to CO$_2$;
   wherein said catalyst composition has been prepared by a preparation process comprising the steps of:
   (A) impregnating a monolith material with a colloidal dispersion of tin dioxide in a suitable liquid dispersion medium;
   (B) heating the tin dioxide-coated material obtained in step (A) so as to obtain a substantially dried tin dioxide-coated monolith material;
   (C) contacting the material obtained in step (B) with at least one dissolved compound of at least one noble metal selected from the group consisting of platinum, and at least one dissolved compound of chromium;
   (D) heating the material obtained in step (C) under such conditions as to substantially dry the material obtained in step (C) and to at least partially convert said at least one compound of at least one noble metal to at least one of oxides of Pt, oxides of Pd, Pt metal and Pd metal and said at least one compound of chromium to at least one oxide of Cr; and
   (E) heating the material obtained in step (D) in a reducing gas atmosphere at a temperature in the range of from about 0° to about 300° C., under such conditions as to activate said material obtained in step (D) and to form said catalyst composition.

2. A process in accordance with claim 1, wherein said catalyst composition comprises about 1 to about 50 weight-% SnO$_2$.

3. A process in accordance with claim 1, wherein said catalyst composition, excluding said monolith material, comprises from about 0.5 to about 5 weight percent of said noble metal and from about 0.1 to about 3 weight-% Cr, expressed as metal.

4. A process in accordance with claim 1, wherein step (D) is carried out in two sub-steps;
   (D1) heating the material obtained in step (C) at a first temperature so as to remove substantially all liquids from said material obtained in step (C), and
   (D2) heating the substantially dried material obtained in step (D1) at a second temperature, which is higher than said first temperature, so as to at least partially convert said at least one compound of at least one noble metal to at least one of oxides of Pt, oxides of Pd, metallic Pt and metallic Pd, and said at least one compound of chromium to at least one oxide of Cr.

5. A process in accordance with claim 4, wherein said first temperature is in the range of from about 30° to about 200° C., said second temperature is in the range of from about 200° to about 500° C., and the temperature in drying step (B) is in the range of from about 30° to about 200° C.

6. A process in accordance with claim 1, wherein said catalyst composition additionally comprises at least one oxide of manganese, said solution used in step (C) further comprises at least one compound of Mn, and said at least one compound of Mn is at least partially converted to at least one oxide of Mn in step (D).

7. A process in accordance with claim 6, wherein said catalyst composition, excluding the monolith material, contains about 0.2 to about 1.0 weight-% of Mn, expressed as metal.

8. A process in accordance with claim 1, wherein said reducing gas atmosphere in step (E) comprises at least one gas selected from the group consisting of free hydrogen and carbon monoxide.

9. A process in accordance with claim 8, wherein step (E) is carried out at a temperature in the range of from about 20° to about 150° C. for a time period in the range of from about 0.1 to about 10 hours.

10. A process in accordance with claim 1, wherein said reaction conditions comprise a reaction temperature in the range of from about 0° C. to about 400° C., a reaction pressure in the range of from about 1 to about 2,000 psia, and a volume ratio of CO to O$_2$ in the range of from about 1:100 to about 100:1.

11. A process in accordance with claim 10, wherein said reaction conditions comprise a temperature in the range of from about 5° C. to about 100° C., a reaction pressure in the range of from about 5 to about 20 psia, and a volume ratio of CO to O$_2$ in the range of from about 1:10 to about 10:1.

12. A process in accordance with claim 11, wherein said reaction conditions further comprise a gas hourly space velocity of about 0.5–10,000 cc of said gas mixture per cc of said catalyst composition, excluding the volume of said monolith support, per hour.

13. A process in accordance with claim 1, wherein said process is carried out in the cavity of a CO$_2$ laser so as to recombine CO and O$_2$ formed by dissociation of CO$_2$.

14. A process for preparing a composition of matter, which is useful and effective as a catalyst composition for CO oxidation, and comprises monolith support material, tin dioxide, at least one noble metal selected from the group consisting of platinum and palladium, and at least one oxide of chromium, said process comprising the steps of:
   (A) impregnating a monolith material with a colloidal dispersion of tin dioxide in a suitable liquid dispersion medium, (B) heating the tin dioxide-coated material obtained in step (A) so as to obtain a substantially dried tin dioxide-coated monolith material;

(C) contacting the material obtained in step (B) with at least one dissolved compound of at least one noble metal selected from the group consisting of platinum and palladium and at least one dissolved compound of chromium;

(D) heating the material obtained in step (C) under such conditions as to substantially dry the material obtained in step (C) and to at least partially convert said at least one compound of at least one noble metal to at least one of oxides of Pt, oxides of Pd, Pt metal and Pd metal, and said at least one compound of chromium to at least one oxide of Cr; and (E) heating the material obtained in step (D) in a reducing gas atmosphere, at a temperature in the range of from about 0° to about 300° C., under such conditions as to activate said material obtained in step (D) and to form a composition of matter effective as a catalyst for CO oxidation.

15. A process in accordance with claim 14, wherein said composition of matter comprises about 1 to 50 weight-% $SnO_2$.

16. A process in accordance with claim 14, wherein said composition of matter, excluding said monolith material, comprises from about 0.5 to about 5 weight percent of said noble metal and from about 0.1 to about 3 weight-% Cr, expressed as metal.

17. A process in accordance with claim 14, wherein said colloidal dispersion used in step (A) contains tin dioxide particles having an average particle diameter in the range of from about 1 to about 100 nanometers, and said liquid dispersion medium is water.

18. A process in accordance with claim 14, wherein the colloidal dispersion used in step (A) comprises about 0.1–50 weight-% $SnO_2$, and the material obtained in step (E) contains about 1–50 weight-% $SnO_2$.

19. A process in accordance with claim 14, wherein the concentration of said at least one dissolved compound of at least one noble metal in an aqueous solution is in the range of from about 0.005 to about 0.20 g noble metal per cc solution, and the concentration of said at least one compound of chromium in an aqueous solution is in the range of from about 0.002 to about 0.01 g Cr per cc solution.

20. A process in accordance with claim 14, wherein step (D) is carried out in two sub-steps;

(D1) heating the material obtained in step (C) at a first temperature so as to remove substantially all liquids from said material obtained in step (C), and (D2) heating the substantially dried material obtained in step (D1) at a second temperature, which is higher than said first temperature, so as to at least partially convert said at least one compound of at least one noble metal to at least one of oxides of Pt, oxides of Pd, metallic Pt and metallic Pd and said at least one compound of chromium to at least one oxide of Cr.

21. A process in accordance with claim 20, wherein said first temperature is in the range of from about 30° to about 200° C., said second temperature is in the range of from about 200° to about 500° C., and the temperature in drying step (B) is in the range of from about 30° to about 200° C.

22. A process in accordance with claim 14, wherein said composition of matter additionally comprises at least one oxide of manganese, said solution used in step (C) further comprises at least one compound of Mn, and said at least one compound of Mn is at least partially converted to at least one oxide of Mn in step (D).

23. A process in accordance with claim 22, wherein said composition of matter, excluding said monolith material, contains about 0.2 to about 1 weight-% of Mn, expressed as metal.

24. A process in accordance with claim 14, wherein said reducing gas atmosphere in step (E) comprises at least one gas selected from the group consisting of free hydrogen and carbon monoxide.

25. A process in accordance with claim 24, wherein step (E) is carried out at a temperature in the range of from about 20° to about 200° C., for a period of time in the range of from about 0.1 to about 20 hours.

26. A composition of matter, which is useful and effective as a catalyst for CO oxidation, comprising monolith support material, tin dioxide, at least one noble metal selected from the group consisting of platinum and palladium, and at least one oxide of chromium, said composition of matter having been prepared by a process comprising the steps of:

(A) impregnating a monolith material with a colloidal dispersion of tin dioxide in a suitable liquid dispersion medium, (B) heating the tin dioxide-coated material obtained in step (A) so as to obtain a substantially dried tin dioxide-coated monolith material;

(C) contacting the material obtained in step (B) with at least one dissolved compound of at least one noble metal selected from the group consisting of platinum and palladium and at least one dissolved compound of chromium;

(D) heating the material obtained in step (C) under such conditions as to substantially dry the material obtained in step (C) and to at least partially convert said at least one compound of at least one noble metal to at least one of oxides of Pt, oxides of Pd, Pt metal and Pd metal, and said at least one compound of chromium to at least one oxide of Cr; and (E) heating the material obtained in step (D) in a reducing gas atmosphere, at a temperature in the range of from about 0° to about 300° C., under such conditions as to activate said material obtained in step (D) and to form a composition of matter effective as a catalyst for CO oxidation.

27. A composition of matter in accordance with claim 26 comprising about 1 to about 50 weight-% $SnO_2$.

28. A composition of matter in accordance with claim 26, wherein said composition of matter, excluding said monolith material, comprises from about 0.5 to about 5 weight percent of said noble metal and from about 0.1 to about 3 weight-% chromium.

29. A composition of matter in accordance with claim 26, wherein said colloidal dispersion used in step (A) contains tin dioxide particles having an average particle diameter in the range of from about 1 to about 100 nanometers, and said liquid dispersion medium is water.

30. A composition of matter in accordance with claim 26, wherein the colloidal dispersion used in step (A) comprises about 0.1–50 weight-% $SnO_2$, and the material obtained in step (E) contains about 1–50 weight-% $SnO_2$.

31. A composition of matter in accordance with claim 26, wherein step (D) is carried out in two sub-steps;

(D1) heating the material obtained in step (C) at a first temperature so as to remove substantially all liquids from said material obtained in step (C), and (D2) heating the substantially dried material obtained in step (D1) at a second temperature, which is higher than said first temperature, so as to at least partially convert said at least one compound of at least one noble metal to at least one of oxides of Pt, oxides of Pd, metallic Pt and metallic Pd, and said at least one compound of chromium to at least one oxide of Cr.

32. A composition of matter in accordance with claim 31, wherein said first temperature is in the range of from about 30° to about 200° C., said second temperature is in the range of from about 200° to about 500° C., and the temperature in drying step (B) is in the range of from about 30° to about 200° C.

33. A composition of matter in accordance with claim 26, additionally comprising at least one oxide of manganese, wherein said solution used in step (C) further comprises at least one compound of Mn, and said at least one compound of Mn is at least partially converted to at least one oxide of Mn in step (D).

34. A composition of matter in accordance with claim 33, wherein said composition of matter, excluding said monolith material, comprises about 0.2 to about 1 weight-% of Mn, expressed as metal.

35. A composition of matter in accordance with claim 26, wherein said reducing gas atmosphere in step (E) comprises at least one gas selected from the group consisting of free hydrogen and carbon monoxide.

36. A composition of matter in accordance with claim 35, wherein step (E) is carried out at a temperature in the range of from about 20° to about 200° C., for a period of time in the range of from about 0.1 to about 20 hours.

* * * * *

UNITED STATES PATENT AND TRADEMARK OFFICE
CERTIFICATE OF CORRECTION

PATENT NO. : 4,830,844
DATED : May 16, 1989
INVENTOR(S) : John H. Kolts

It is certified that error appears in the above-identified patent and that said Letters Patent is hereby corrected as shown below:

Claim 1, Column 9, line 45, insert --- and palladium --- after "platinum".

Signed and Sealed this
Thirteenth Day of February, 1990

*Attest:*

JEFFREY M. SAMUELS

*Attesting Officer*  *Acting Commissioner of Patents and Trademarks*